Figure 1:
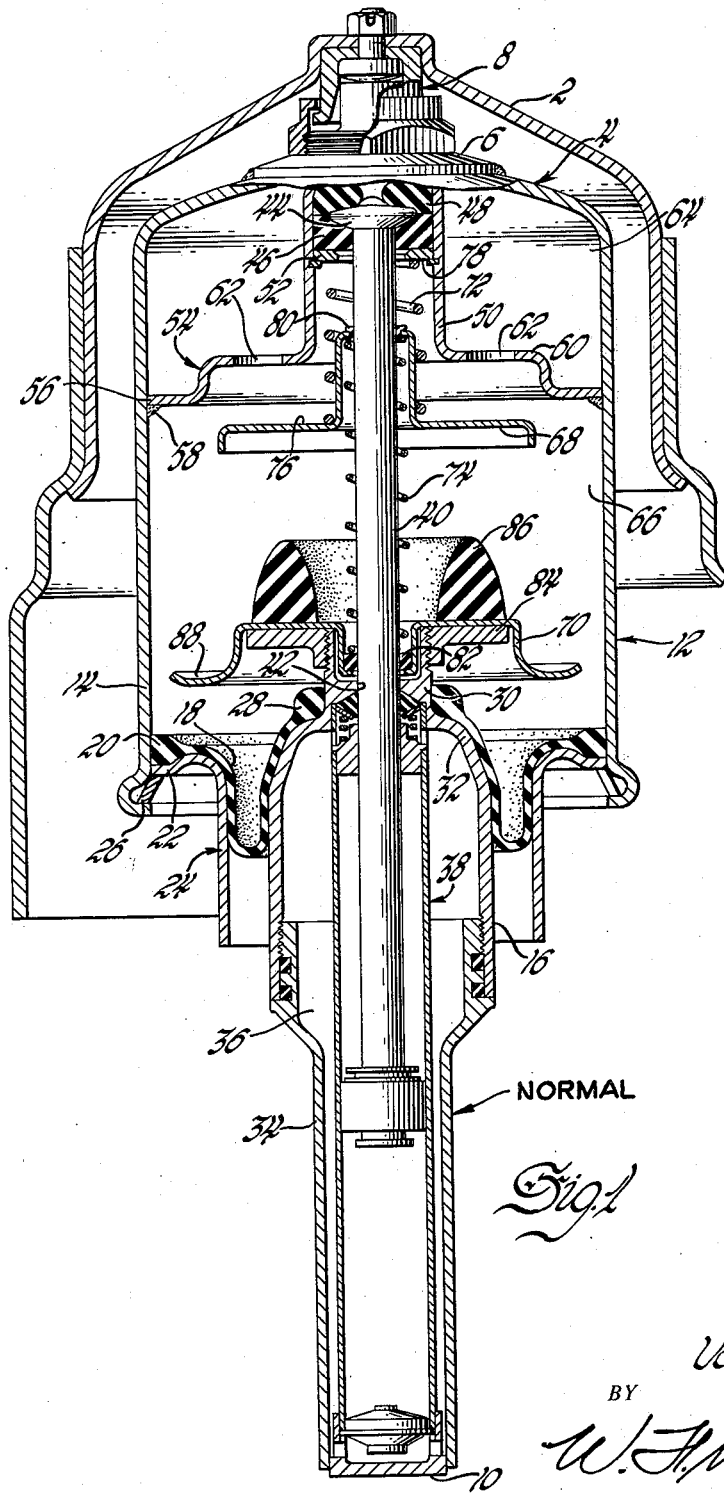
Figure 2:
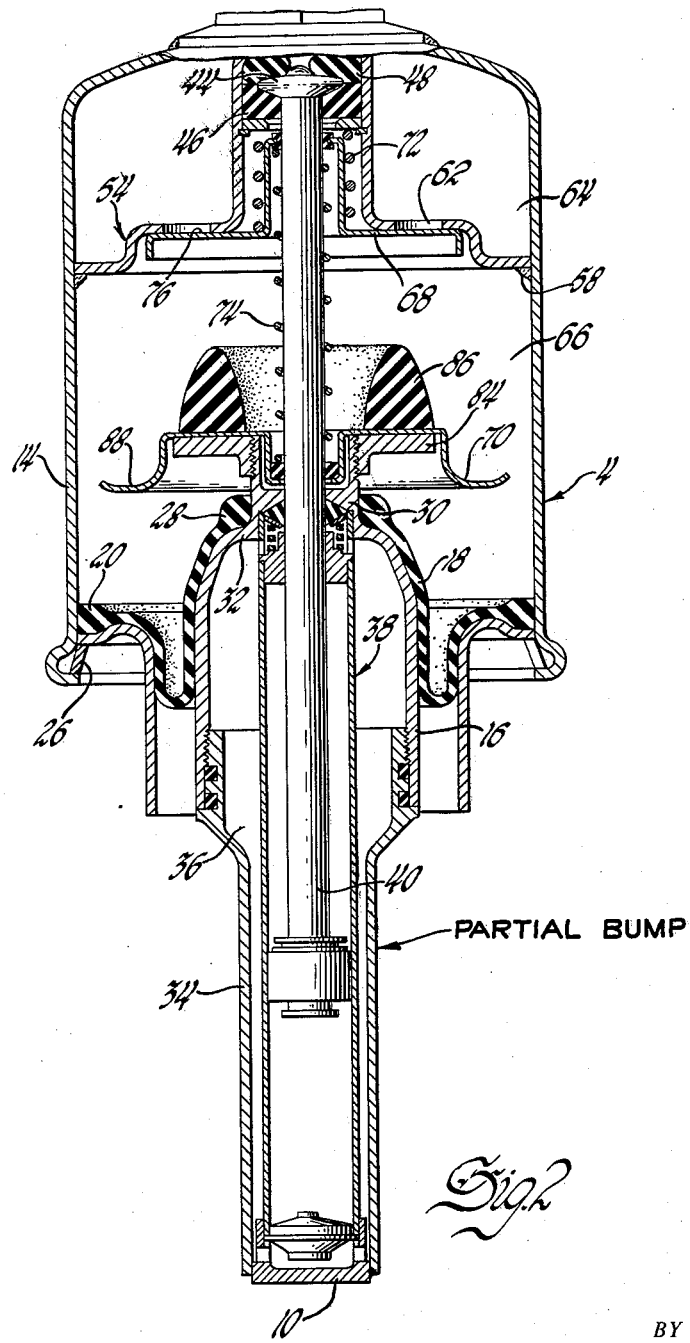
Figure 3:
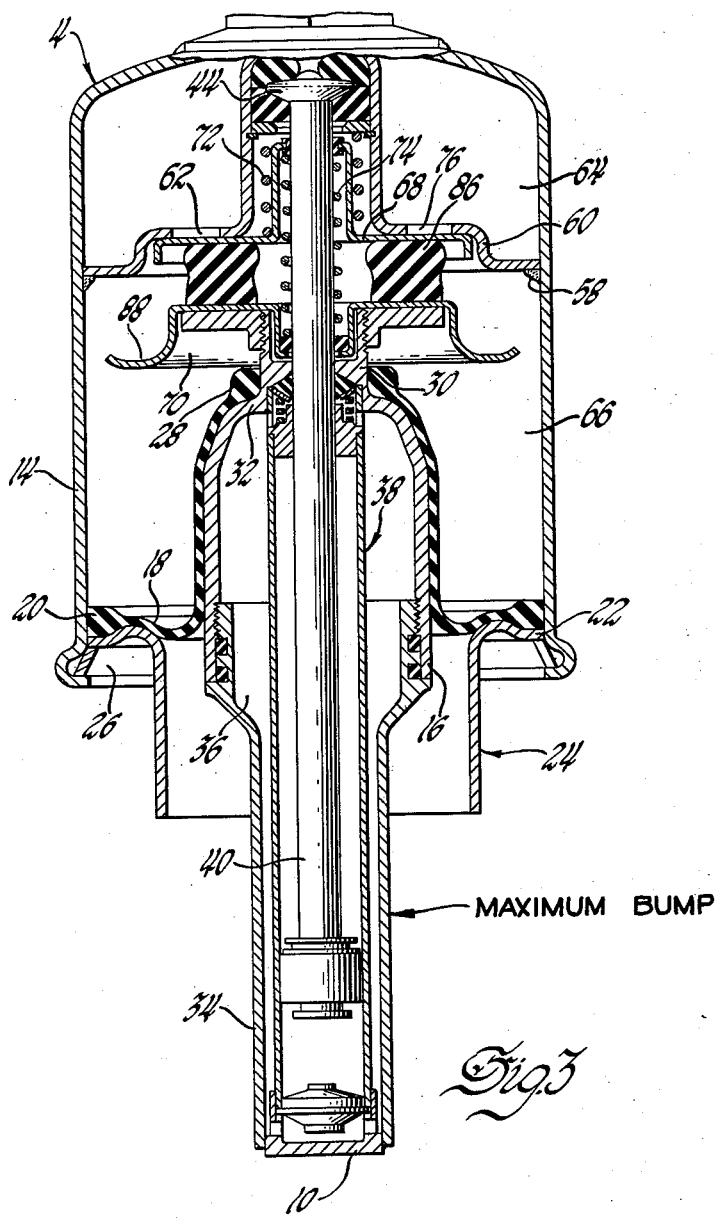
Figure 4:
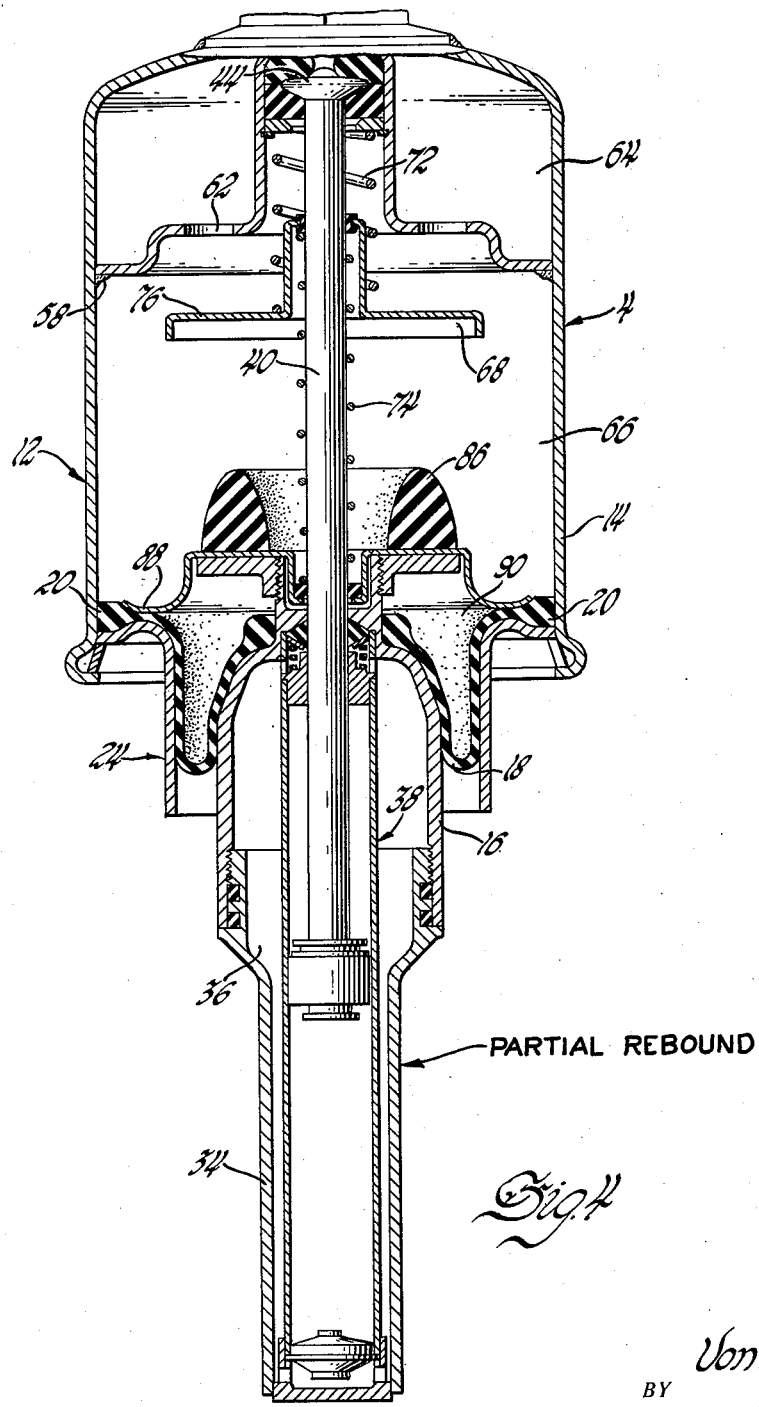
Figure 5:
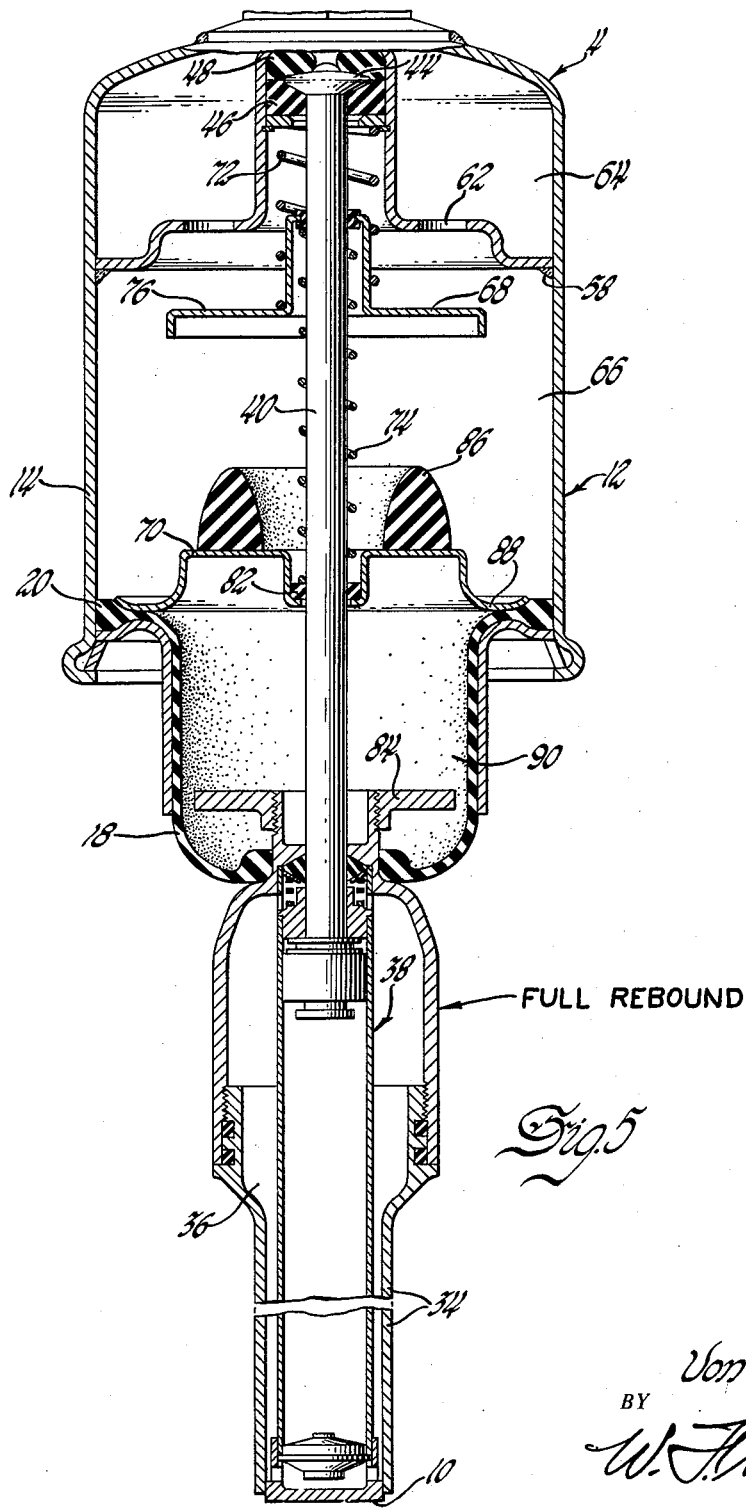

Sept. 19, 1961  V. D. POLHEMUS  3,000,625
MULTIPLE STAGE VARIABLE RATE SPRING
Filed Nov. 19, 1958  5 Sheets-Sheet 1

NORMAL

INVENTOR.
Von D. Polhemus
BY
W. H. Wagner
ATTORNEY

Sept. 19, 1961 V. D. POLHEMUS 3,000,625
MULTIPLE STAGE VARIABLE RATE SPRING
Filed Nov. 19, 1958 5 Sheets-Sheet 2

PARTIAL BUMP

INVENTOR.
Von D. Polhemus
BY
W. H. Wagner
ATTORNEY

Sept. 19, 1961 V. D. POLHEMUS 3,000,625
MULTIPLE STAGE VARIABLE RATE SPRING
Filed Nov. 19, 1958 5 Sheets-Sheet 4

PARTIAL REBOUND

INVENTOR.
Von D. Polhemus
BY
W. F. Wagner
ATTORNEY

Sept. 19, 1961 V. D. POLHEMUS 3,000,625
MULTIPLE STAGE VARIABLE RATE SPRING
Filed Nov. 19, 1958 5 Sheets-Sheet 5

INVENTOR.
Von D. Polhemus
BY
W. F. Wagner
ATTORNEY

United States Patent Office

3,000,625
Patented Sept. 19, 1961

3,000,625
MULTIPLE STAGE VARIABLE RATE SPRING
Von D. Polhemus, Franklin, Mich., assignor to General Motors Corporation, Detroit, Mich., a corporation of Delaware
Filed Nov. 19, 1958, Ser. No. 775,029
9 Claims. (Cl. 267—65)

This invention relates to pneumatic suspension for vehicles and more particularly to improved air spring constructions therefor.

It is well known that the resistance of an air spring increases progressively with load, whereas metal springs exhibit uniform resistance to increase of load. Because of their variable rate behavior, air springs in vehicle suspension have the inherent ability to resist "bottoming" or striking through resulting from excessive compression deflection of the vehicle wheels. However, experience has shown that a vehicle air spring having the desired rate curve during the limited range of deflection experienced under ordinary riding conditions will not necessarily provide a rate increase in the bump position sufficient to fully eliminate striking through. In my copending application Serial No. 738,402, now Patent No. 2,956,797, entitled "Dual Volume Variable Rate Air Spring," there is disclosed an air spring having mechanical means for automatically reducing the effective volume of air acted upon by the spring piston after the latter has deflected toward the bump position a predetermined amount so that subsequent upward deflection is characterized by a substantially increased spring rate. From further investigation it has been determined that a similar increase in spring rate as the piston moves toward the rebound position results in reducing the opposite effect of striking through, namely, the occurrence of mechanical shock imposed on the suspension parts by sudden dropping of the unsprung mass of a vehicle relative to the sprung mass.

An object of the invention is to provide a multiple stage variable rate spring.

Another object is to provide an air spring assembly having a different rate curve for each of three stages of spring deflection.

A further object is to provide a piston, cylinder, and diaphragm type spring including means for automatically compartmenting the normal volume of air acted upon by the piston in predetermined relation to the deflection position thereof so that normal or ride deflection movement thereof causes compression and expansion of all of the air contained in the total volume of the spring, while deflection thereof in ranges approaching either the bump and rebound positions of the spring cause compression and expansion of less than the total volume of air contained in the spring.

Still another object is to provide a piston, cylinder, and diaphragm type spring which includes means for automatically compartmenting the normal volume of air acted upon by the piston in a predetermined relation to the deflection position of the piston so that oscillation of the latter through a first range of movement above and below the normal or static load supporting position of the spring causes compression and expansion of all of the air contained in the total volume of the spring, oscillation thereof through a second range of movement approaching the bump position of the spring causes compression and expansion of less than the total volume of the spring, and oscillation thereof through a third range of movement approaching the rebound position of the spring also causes compression and expansion of less than the total volume of air, the reduction effected upon movement toward rebound being greater than upon movement toward compression.

Yet a further object is to provide a piston, cylinder, and diaphragm type spring including axially movable valve means acting to selectively reduce the effective internal volume of the spring in accordance with predetermined deflection positions of the piston.

A still further object is to provide a structure of the stated character including two relatively movable axially spaced valves, operatively connected to the piston.

Yet another object is to provide a spring of the stated character wherein the cylinder includes a fixed partition having openings closeable by a valve structure impositively driven by the piston, the piston including a second valve member yieldably seated thereon operable to compartment another portion of the spring upon movement of the piston in a direction opposite to that required to place the first valve in a closing position.

These and other objects, advantages, and features of the invention will become more clearly apparent as reference is had to the accompanying specification and drawings wherein:

FIG. 1 is a side elevational view, partly in section and with parts broken away, illustrating the structure and arrangement of an air spring incorporating the present invention; and FIGS. 2, 3, 4, and 5 are views similar to FIG. 1 illustrating the progressive sequence or stages of operation of the spring.

Referring now to the drawings and particularly FIG. 1, the reference numeral 2 designates generally a sheet metal shroud forming part of the sprung mass of a vehicle, not shown. Partially recessed in shroud 2 is an air spring assembly 4, the upper end 6 of which is connected to shroud 2 by a semi-universal pivot assembly 8. At its opposite end 10, spring 4 is intended to be attached, as by a connection such as 8, to a portion of the unsprung mass of the vehicle, not shown.

Spring assembly 4 includes a dome structure 12 having a cylindrical depending wall 14 and a spring piston 16 of reduced diameter arranged for vertical reciprocatory movement into and out of the dome. A flexible diaphragm 18 extends between the lower open end or mouth of dome 12 and piston 16 and is provided with an outer peripheral bead 20 which sealingly engages the inner surface of wall 14 and the horizontal ledge portion 22 of tubular depending diaphragm retainer 24. Retainer 24, in turn, is secured to dome 12 by a circular snap ring 26. The inner peripheral bead 28 of diaphragm 18, in turn, surrounds the upper terminal neck portion 30 of piston 16 and rests on the upper wall 32 of the latter.

In accordance with one feature of the invention, piston 16 has a depending hollow stem portion 34 threadably secured thereto forming a cavity 36 in which is disposed a telescoping hydraulic shock absorber assembly 38. Assembly 38 includes a piston rod 40 which extends upwardly through an aperture 42 formed in neck portion 30 of piston 16. At its upper end, rod 40 is formed with a button-like end 44 which is resiliently connected to dome portion 12 in axial alignment with pivot assembly 8 by means of a pair of vertically spaced elastic elements 46 and 48. Elements 46 and 48 are secured in the upper end of a vertically extending tubular neck portion 50 by a retainer ring 52.

Neck portion 50 forms an integral part of an annular generally horizontal partition 54 located vertically intermediate dome 12. The outer circular edge 56 of partition 54 engages the cylindrical wall 14 of dome 12 and is secured thereto by means of continuous peripheral weld 58. Spaced at intervals circumferentially around the intermediate web portion 60 of partition 50 are a series of apertures 62, the diameters of which are sufficient to permit unrestricted fluid communication between the cavity 64 located above the partition and the cavity 66 located below the partition.

In accordance with another feature of the invention, the piston rod 40 has slidably disposed thereon an upper disc-like valve element 68 and a lower disc-like valve or movable partition element 70 which are yieldably positioned in predetermined vertical relation to piston 16 by coil springs 72 and 74. Coil spring 72 reacts between the upper wall 76 of valve 68 and the lower wall 78 of retainer ring 52, while coil spring 74 reacts between the lower surface of bearing element 80 on valve 68 and the upper surface of bearing element 82 of valve 70. Springs 72 and 74 are initially calibrated so that the valve 68 is urged to the vertically intermediate position shown when piston 16 occupies normal static or design height position while valve 70 is biased by the reaction of spring 74 into abutting engagement with the annular support plate 84 threadably secured to piston neck 30.

In operation, valves 68 and 70 function in the following manner in order to accomplish compartmentation of the internal volume of the spring in three defined stages coordinated with the position of and direction of displacement of the piston and thus carry out the stated objects of the invention.

Referring first to FIG. 1 wherein the spring assembly is shown in the normal load deflection or design height position, it will be seen that valve 68 is biased to a vertical position displaced downwardly from partition 54. With valve 68 in the position indicated, ports 62 permit unrestricted interchange of air between cavities 64 and 66. Accordingly, limited deflection of piston 16 above and below the normal load position results in a first stage of operation involving uniform compression and expansion of the total volume of air contained in both cavities 64 and 66. However, as the piston 16 deflects upwardly to the partial bump position shown in FIG. 2, movement thereof compresses coil spring 74 which, in turn, urges valve 68 upwardly into abutting engagement with web portion 60 of partition 54 against the resistance of coil spring 72. With valve 68 in the position shown in FIG. 2, apertures 62 in web portion 60 are closed, and the air contained in cavity 64 is therefore separated from cavity 66. Therefore, continued upward deflection of the piston results in further compression of the air in cavity 66 only. Consequently, either limited oscillation of the piston in this upwardly displaced range or continued upward displacement thereof requires that the piston act upon a volume of air substantially less than the volume of air acted upon in the ride deflection range. Since the effective diameter of the piston remains virtually constant in the spring construction shown, it will be evident that the smaller volume of air in cavity 66 will offer considerably increased resistance to piston deflection, thereby causing a transition in operation of the spring to a second stage of higher rate than the first stage. Since the inherent variable rate characteristic of the spring continues, as the piston reaches the maximum limit of compression deflection or bump position, the effective rate will have risen to a level approximating or equal to the deflection rate of the elastic annular bump stop 86 carried on the upper surface of valve 70. As a result of the rate merging effected thereby, little or no "bottoming" effect will be experienced by vehicle passengers. Upon return movement of piston 16 to normal load range shown in FIG. 1, coil spring 74 relaxes allowing coil spring 72 to urge valve 68 downwardly and thus reopen the passages 62 so that normal oscillation of the piston again acts upon the entire volume of air in the spring. When piston 16 moves downwardly from the design height position to the partial rebound position shown in FIG. 4, valve 70 moves downwardly therewith by virtue of the combined force exerted by coil springs 72 and 74 until the level of the piston allows the flared peripheral portion 88 of the valve to seat upon the outer peripheral bead 20 of diaphragm 18 and thus form a temporary partition causing both cavities 64 and 66 to be blocked from communication with the newly established cavity 90 between valve 70 and piston 16. Accordingly, continued movement of the piston to the full rebound position shown in FIG. 5 requires that the piston act only on the volume of air confined in the cavity 90 thus resulting in a substantially increased spring rate in the designated rebound range of movement.

It will now be seen that an air spring according to the present invention operates in a manner of conventional air springs during normal ride deflection but provides markedly increased resistance to displacement toward either the maximum bump or rebound positions of the spring. It will also be noted that compartmentation of the spring is accomplished without permanent restriction between the various compartments. Hence, the function of the spring during the normal ride deflection phase of operation is not adversely influenced.

While but one embodiment of the invention has been shown and described, it will be understood that other changes and modifications may be made therein. It is, therefore, to be understood that it is not intended to limit the invention to the embodiment shown, but only by the scope of the claims which follow.

I claim:

1. A multiple stage variable rate spring comprising, a piston and cylinder connected by a flexible diaphragm, a partition fixed in said cylinder having openings therein, a movable imperforate partition resiliently biased against said piston, said movable partition being spaced radially inwardly from the wall of said cylinder, closure means for said openings yieldably movable with said piston, and means on said cylinder forming a ledge portion engageable with said movable partition, said movable partition being located vertically between said closure means and said ledge portion.

2. A multiple stage variable rate air spring comprising, a cylinder having a piston reciprocably movable therein, a flexible diaphragm connecting said cylinder and piston, a fixed wall in said cylinder forming a perforate partition, a movable imperforate partition resiliently biased against said piston, closure means for said perforate wall movable with said piston, said movable partition being dimensioned so as to provide an annular clearance between the movable partition and the cylinder wall yieldably, and means forming an annular ledge portion of said cylinder spaced from said perforate partition, said ledge being engageable by said movable partition.

3. A multiple stage variable rate spring comprising, two relatively movable members connected by a flexible diaphragm, one of said members having an intermediate perforate partition and an annular ledge portion spaced therefrom, and means associated with the other of said members effective to close said perforate partition responsive to predetermined movement of the former in one direction, and means acting upon movement in the other direction to yieldably engage said ledge portion before said other member reaches its limit of movement in said other direction and form a temporary partition spaced from said perforate partition.

4. An air spring comprising an inflexible inverted cup-shaped container having a perforate partition vertically intermediate thereof, a piston movable into and out of said container, a flexible diaphragm interconnecting said piston and the lower end of said container, and valve means in said container arranged coaxially with said piston, said means being yieldably movable responsive to compression deflection of said piston to engage said perforate partition, and additional valve means coaxial with said piston resiliently biased against the latter and movable therewith responsive to rebound deflection thereof to engage the lower end of said container, whereby the effective volume of air acted upon by said piston is reduced as said piston approaches either compression or rebound position.

5. In an air spring, an inflexible inverted cup-shaped container having a lower open end including a transverse radially inwardly extending ledge, a partition dividing said container into two cavities, said partition having at least one opening therein, a piston reciprocably movable into and out of said container generally coaxially thereof, a flexible diaphragm interconnecting said piston and the open end of said container, a pair of vertically spaced circular closure members disposed in said container in axial alignment with said piston, yieldable means operatively connecting said closures to said piston, one of said closures acting to sealingly engage said partition upon predetermined upward movement of said piston and thereby close the cavity above said partition during further upward movement of said piston, the other of said closures acting to sealingly engage the ledge on said container upon predetermined downward movement of said piston and thereby form a third cavity separated from said first and second cavities during further downward movement of said piston.

6. An air spring comprising an inflexible inverted cup-shaped container having a lower open end including a circular radially inwardly extending ledge, a fixed partition dividing said container into two cavities, said partition having at least one opening therein, a telescoping shock absorber arranged concentrically of said container, said absorber including a casing and a piston rod, said rod being operatively connected to the upper closed end of said container, a hollow piston surrounding said shock absorber and reciprocably movable in and out of said container along the axis of said rod, a flexible diaphragm interconnecting said piston and the open end of said container, a pair of vertically spaced circular closure members slidably disposed on said rod, and yieldable means on said rod operatively connecting said closures to said piston, the upper of said closures acting to sealingly engage said partition upon predetermined upward movement of said piston and thereby close the cavity above said partition during further upward movement of said piston, the lower of said closures acting to sealingly engage the circular ledge on said container upon predetermined downward movement of said piston and thereby form a third cavity separated from said first and second cavities during further downward movement of said piston.

7. The structure set forth in claim 6 wherein said second closure includes an annular rubber element engageable with said first closure upon deflection of said piston to maximum bump position.

8. The structure set forth in claim 6 wherein said upper closure is yieldably driven in both directions, and said lower closure is yieldably driven in one direction and positively driven in the other direction.

9. The structure set forth in claim 6 wherein said yieldable means comprise a first coil spring reacting between said container and said upper closure and a second coil spring reacting between the upper and lower closures.

References Cited in the file of this patent

UNITED STATES PATENTS

| 991,165 | Mills | May 2, 1911 |
| 1,085,818 | Oxnard | Feb. 3, 1914 |
| 1,119,984 | Oxnard | Dec. 8, 1914 |
| 2,476,228 | Thornhill | July 12, 1949 |

FOREIGN PATENTS

| 793,772 | Great Britain | Apr. 23, 1958 |

UNITED STATES PATENT OFFICE
CERTIFICATE OF CORRECTION

Patent No. 3,000,625                          September 19, 1961

Von D. Polhemus

It is hereby certified that error appears in the above numbered patent requiring correction and that the said Letters Patent should read as corrected below.

Column 4, lines 40 and 41, strike out "closure means for said perforate wall movable with said piston,"; line 43, for "yieldably," read -- , closure means for said perforate wall yieldably movable with said piston, --.

Signed and sealed this 6th day of March 1962.

(SEAL)
Attest:

ERNEST W. SWIDER
Attesting Officer

DAVID L. LADD
Commissioner of Patents